…

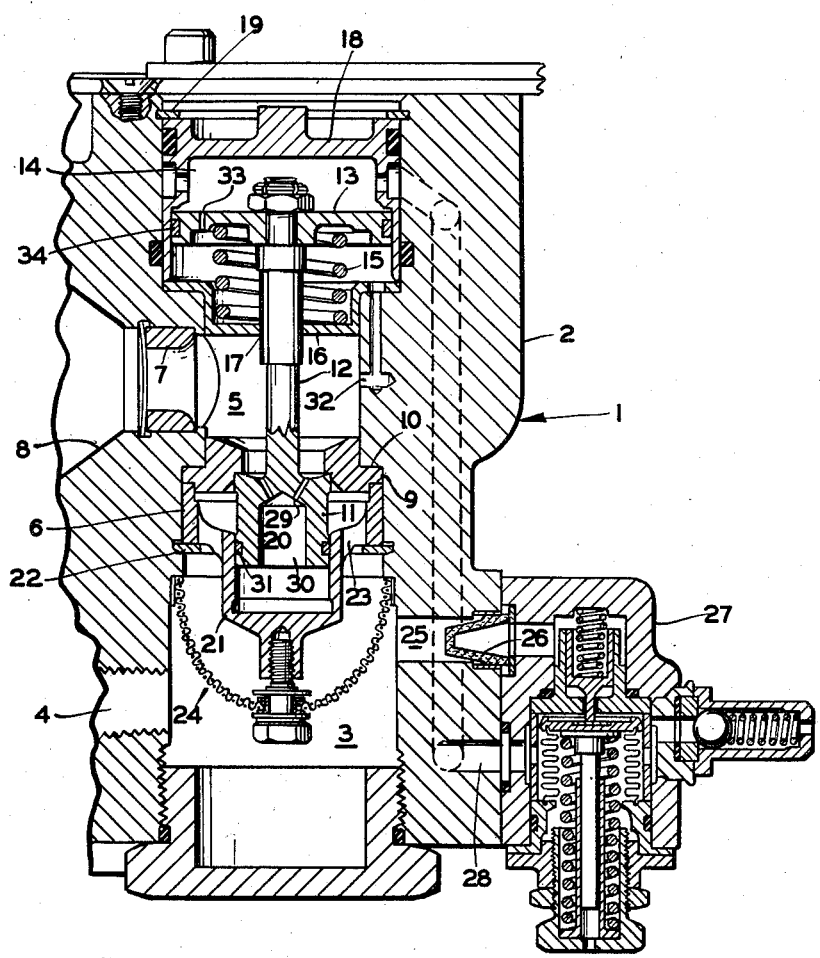

United States Patent Office 2,841,173
Patented July 1, 1958

2,841,173

CONTROL VALVE

Richard J. Mason, Lyndhurst, and John S. Jaquith, Cedar Grove, N. J., assignors to Bendix Aviation Corporation, Teterboro, N. J., a corporation of Delaware Application February 19, 1953, Serial No. 337,753

1 Claim. (Cl. 137—505.18)

The present invention relates to control valves and more particularly to air control valves adapted to provide a proper flow of pressurized air to the combustion chamber of a device where liquid fuel is burned in air.

In a device of the type where a liquid fuel is burned in air and a high degree of burning efficiency is essential, it is important that the ratio of air to fuel be closely controlled. Also it is desirable that the flow of air be promptly initiated upon energization of the system.

Various types of control valves have been used in the past; however, difficulty has been encountered with variation in the flow of air and also by the tendency of the valves to fluctuate.

The present invention provides a valve that provides a constant flow of air over a wide range of input pressure. Also means are provided for preventing fluctuation or hunting of the valve.

It is an object of the invention to provide an improved control valve. Another object of the invention is to provide a novel air control valve adapted to provide a constant flow of pressurized air.

Another object of the invention is to provide a novel air valve that will promptly initiate the flow of air.

Another object of the invention is to provide an air control valve that is substantially free from fluctuation.

The above and other objects and features of the invention will appear more fully hereinafter from a consideration of the following description taken in connection with the accompanying drawing wherein one embodiment of the invention is illustrated by way of example.

In the drawing:

The single figure is a cross section view of a valve embodying the invention.

Referring to the drawing a valve is indicated generally by the numeral 1 as having a housing 2, having a high pressure chamber 3 adapted to be connected to a source of high pressure air (not shown) by inlet 4. The chamber 3 connects with an outlet chamber 5 by passageway 6. The chamber 5 is connected by a nozzle 7 and outlet 8 to a combustion chamber (not shown).

A valve seat 9 is positioned by means of a shoulder 10 on the housing 2 in the passageway 6. A valve member 11 is adapted to coact with the seat 9 and is connected by a rod 12 extending through the chamber 5 and connecting with piston 13 in a pilot chamber 14. A spring 15 is held by a plate 16 and biases the piston upwards. The plate 16 is provided with an opening 17 through which the rod 12 passes. The opening 17 is of a size that will just provide clearances for the rod 12. A piston cylinder 18 is provided in the pilot chamber 14 and is positioned by means of a snap ring 19.

The valve member 11 has a portion 20 adapted for a sliding fit in guide member 21. The guide member 21 is held in position by a snap ring 22 and has openings 23 to permit the passage of air therethrough. Also secured to the member 21 is a screen 24.

Connecting with the chamber 3 is a passageway 25 having a filter 26 mounted therein and connecting to an air reducer valve 27. The air reducer valve 27 may be of the spring loaded type and a detailed explanation thereof is omitted inasmuch as it is not a part of the present invention. Connecting from the reducer valve 27 is a passageway 28 connecting the output of the valve 27 with the chamber 14.

The valve seat member 11 has a passageway 29 connecting a counterbore portion 30 in the portion 20 with the chamber 5 in order that the pressure on both sides of the valve member 11 are balanced and movement thereof is dependent upon movement of the piston 13. Sealing means 31 may be positioned between the member 20 and guide 21.

A passageway 32 in the housing 2 provides means to equalize the pressures above and below the retaining plate 16. A bleed hole 33 is provided in the piston 13 to prevent excess pressure from building up in the chamber 14. Sealing means 34 are provided between the piston 13 and the member 18.

In operation high pressure air enters through the opening 4 and passes through the passage 25 reducing valve 27 and passageway 28 into the chamber 14. With the chamber 5 at atmospheric pressure the piston 13 will be forced downward against the bias of spring 15 thereby opening the valve member 11. This permits high pressure air to pass from a chamber 3 through screen 24 and openings 23 into the chamber 5 whence it flows outward through the nozzle 7 into the combustion chamber 8. The retaining plate 16 is fitted around the shaft 12 so that there will not be too great a pressure differential in the chamber 5 due to velocity through the valve 11. The equalizing passage 32 serves to equalize pressures above and below the retaining plate 16 yet does not subject the piston to velocity shock. The valve seat 9 is contoured to provide a progressively greater opening as the valve member 11 is moved away therefrom. The area of the piston 13 and the valve 11 are so selected in consideration with the main supply pressure as admitted into the chamber 3 and the pressure as reduced by the reducer 27 so that the differential in pressure across the piston 13 together with the force due to the spring 15 will maintain a substantially constant pressure downstream of the valve 11.

Although only one embodiment of the invention has been illustrated and described various changes in the form and relative arrangement of the parts, which will now appear to those skilled in the art, may be made without departing from the scope of the invention.

What is claimed is:

An air control for supplying a substantially constant output pressure from a source of varying pressure, comprising a housing having side inlet means and side outlet means, said housing having in succession a large lower bore, a central small bore and a large upper bore, said lower bore forming a high pressure chamber and connecting with the inlet means, said central bore forming a low pressure chamber and connecting with the outlet means, a valve seat arranged at the inner end of said lower bore and having a passageway axially connecting the high and low pressure chambers, an elongated valve member having a cylindrical head portion and an upperside area and an underside area, the upper edge of the cylindrical head portion cooperating with said valve seat in said passageway to vary the opening thereof so that the upperside area of said head portion is subject to pressure air in the low pressure chamber, the valve member having a cylindrical body portion coextensive with the periphery of said head portion extending into the high pressure chamber, a guide member having a closed bore receiving the cylindrical body portion of the valve member for shielding the underside area of the head portion of the valve member from the pressure of the pressure air in the high pressure chamber, the inner peripheral part of the guide member being removably positioned against said valve seat in the high pressure chamber and having openings to said valve seat, the outer part of said guide member being spaced from the walls of said lower bore, at least one bleed passage in the head portion of said valve member opening the bore of said guide member to the pressure in said low pressure chamber so that the pressure of the air in the low pressure chamber is applied at the underside area as well as at the upperside area of said valve member, a valve rod secured at one end to the valve member and extending through said passageway and the low pressure chamber and into said upper bore, a piston member in said upper bore secured to the other end of the valve rod and forming a pilot chamber above the piston, a cup-shaped partition plate in contact with said rod and forming a spring chamber beneath the piston, a coil spring about the valve rod expanded between the underside of the piston and the bottom wall of the cup-shaped partition plate and biasing the piston upwards in a sense to cause the head portion of the valve member to close the passageway, said spring being the only means urging said valve member to closed position, the partition plate serving as a shield for the piston member against velocity shock of pressure air flowing from the high pressure chamber through the valve passageway to the low pressure chamber, means including a pressure reducer and a passageway in the housing communicating the high pressure chamber with the pilot chamber, channel means in the housing communicating the spring chamber with the low pressure chamber to equalize the pressures thereon, the piston being responsive to pressure in the pilot chamber to overcome the spring bias so as to actuate the head portion of the valve member in a sense to open the passageway, and said piston having a bleed hole therethrough so that the pressure in said pilot chamber can be relieved through said spring chamber.

References Cited in the file of this patent

UNITED STATES PATENTS

| | | |
|---|---|---|
| 1,033,174 | Hochfeldt | July 23, 1912 |
| 1,210,891 | Blanchard | Jan. 2, 1917 |
| 1,260,646 | Coffey | Mar. 26, 1918 |
| 1,507,262 | Snyder | Sept. 2, 1924 |
| 1,769,612 | Wettstein | July 1, 1930 |
| 2,003,828 | Ey | June 4, 1935 |
| 2,082,223 | Smith | June 1, 1937 |
| 2,487,089 | Anthes | Nov. 8, 1949 |
| 2,487,650 | Grove | Nov. 8, 1949 |
| 2,599,577 | Norgren | June 10, 1952 |
| 2,692,114 | Fullwood | Oct. 19, 1954 |

FOREIGN PATENTS

| | | |
|---|---|---|
| 56,825 | Sweden | Oct. 18, 1920 |